(12) United States Patent
Potter

(10) Patent No.: US 7,076,885 B2
(45) Date of Patent: Jul. 18, 2006

(54) MAGNETIC TOOL AND TOOL HOLDER WITH CAM RELEASE

(76) Inventor: Stephen B. Potter, 2805 Rose Hill Rd., Marietta, NY (US) 13110

( * ) Notice: Subject to any disclaimer, the term of this patent is extended or adjusted under 35 U.S.C. 154(b) by 12 days.

(21) Appl. No.: 10/858,892

(22) Filed: Jun. 2, 2004

(65) Prior Publication Data

US 2005/0268480 A1 Dec. 8, 2005

(51) Int. Cl.
*G01B 3/10* (2006.01)
(52) U.S. Cl. ............... 33/768; 33/DIG. 1; 224/901
(58) Field of Classification Search ............... 33/768, 33/758, 761, 769, 776, DIG. 1; 224/183, 224/901, 904
See application file for complete search history.

(56) References Cited

U.S. PATENT DOCUMENTS

| | | | | |
|---|---|---|---|---|
| 5,025,966 | A * | 6/1991 | Potter | 224/183 |
| 5,213,240 | A * | 5/1993 | Dietz et al. | 224/183 |
| D457,311 | S * | 5/2002 | Dedrick | D3/228 |
| 6,382,482 | B1 * | 5/2002 | Chao | 224/312 |
| 6,457,252 | B1 * | 10/2002 | Kershner | 33/760 |
| 2003/0067397 | A1 * | 4/2003 | Trimble | 340/825.49 |
| 2004/0124220 | A1 * | 7/2004 | Blechman | 224/162 |

* cited by examiner

Primary Examiner—G. Bradley Bennett
(74) Attorney, Agent, or Firm—George R. McGuire; Bond, Schoeneck & King, PLLC

(57) ABSTRACT

A tool and tool holder with a permanent magnet mounted upon one and a magnetically permeable keeper on the other are provided with respective camming surfaces which are cooperatively engaged when the tool is rotated, breaking the magnetic attraction between opposing surfaces of the magnet and keeper to facilitate removal of the tool from the holder. A cup-like receptacle is mounted upon a body portion of the tool, disclosed in each of two embodiments as a flexible, metal measuring tape contained within a hollow housing, and one of the magnet and keeper is disposed within this receptacle. The camming surface on the tool comprises convex protrusions within the receptacle in a first embodiment, and protrusions extending outwardly from the periphery of the receptacle in a second embodiment. A recess is formed in a surface of the holder to receive the receptacle on the tool when the latter is releasably mounted upon the holder. The other of the magnet and keeper, as well as the camming surface on the holder, is disposed within the recess. A receiver and indicator may be attached to or integrally formed in the tool, to be activated by a signal from a transmitter, which may be attached to or integrally formed in the holder. When activated, the indicator provides a visible or audible indication to aid in locating the tool when it is separated from the holder. Belt loops and a pencil holder may be integrally formed with the holder body portion.

28 Claims, 9 Drawing Sheets

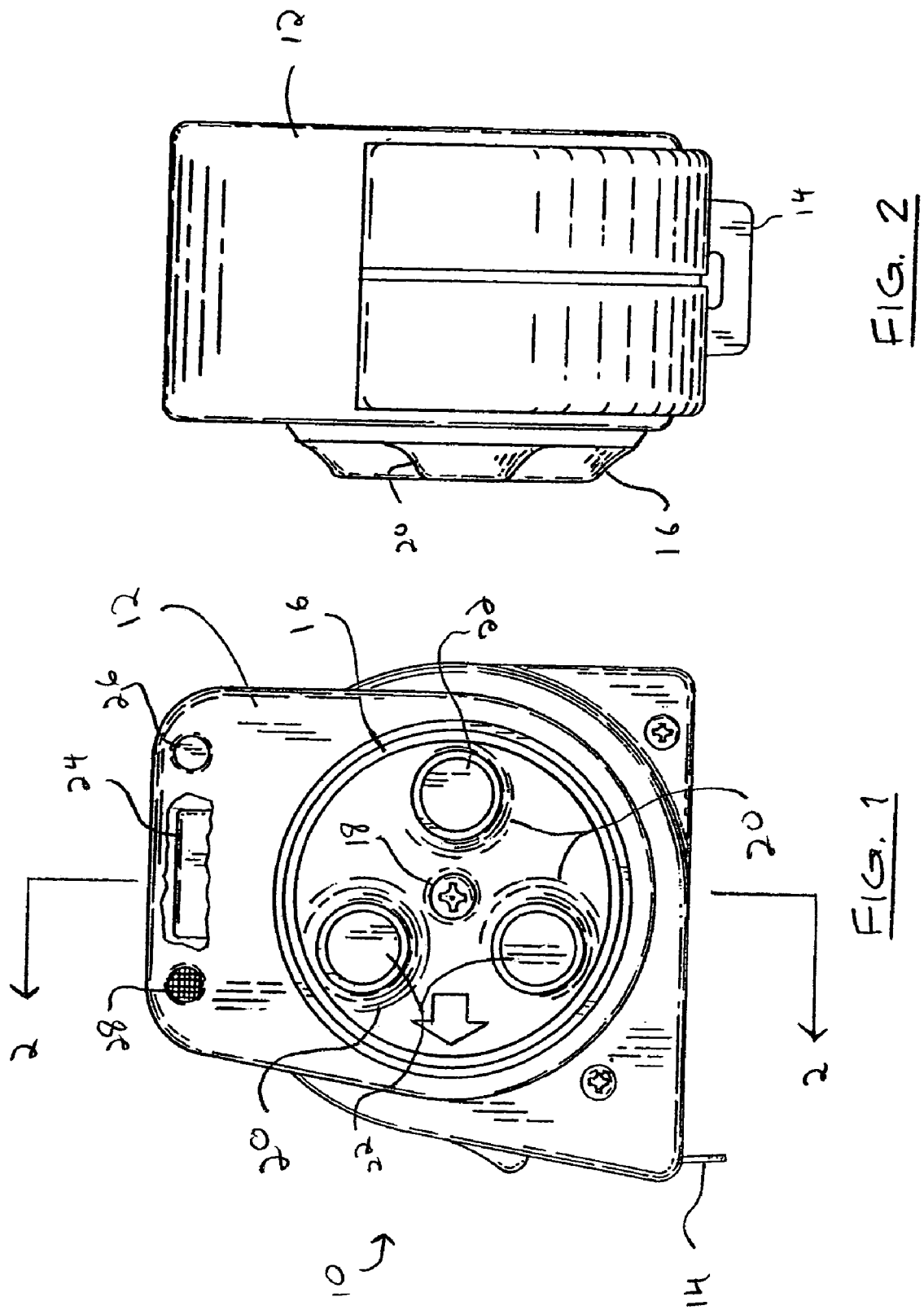

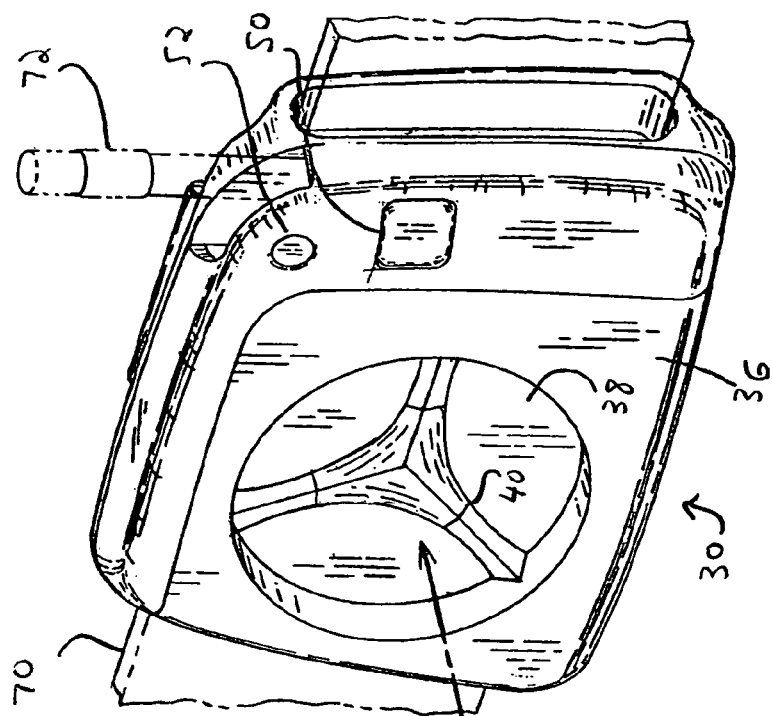
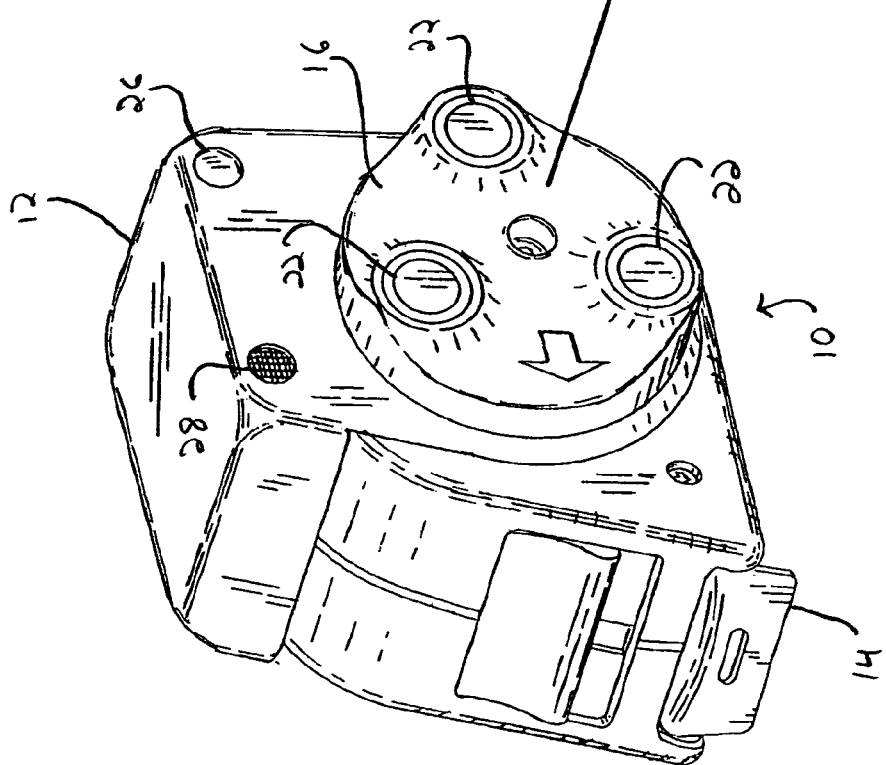
FIG. 9
FIG. 8

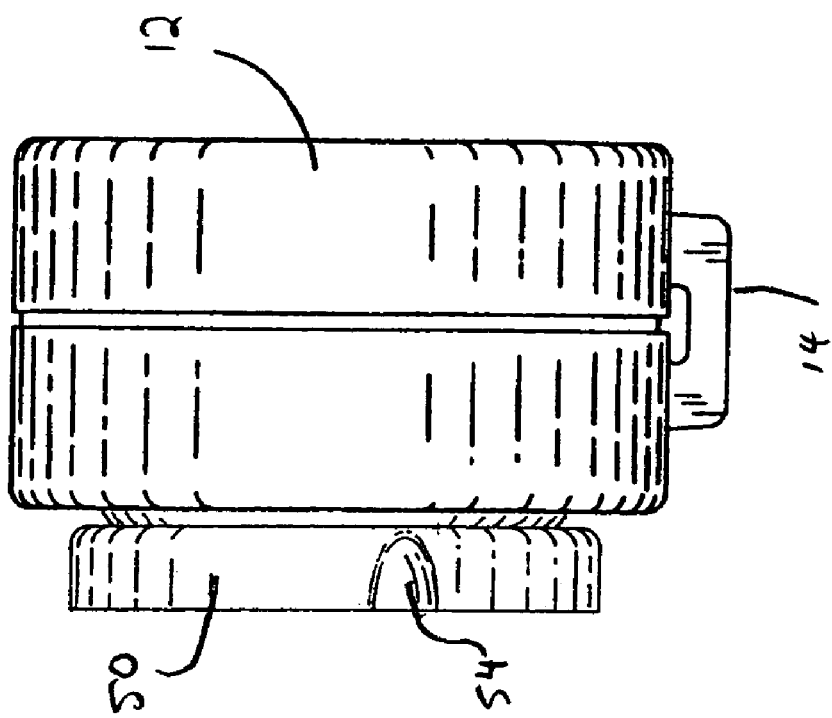
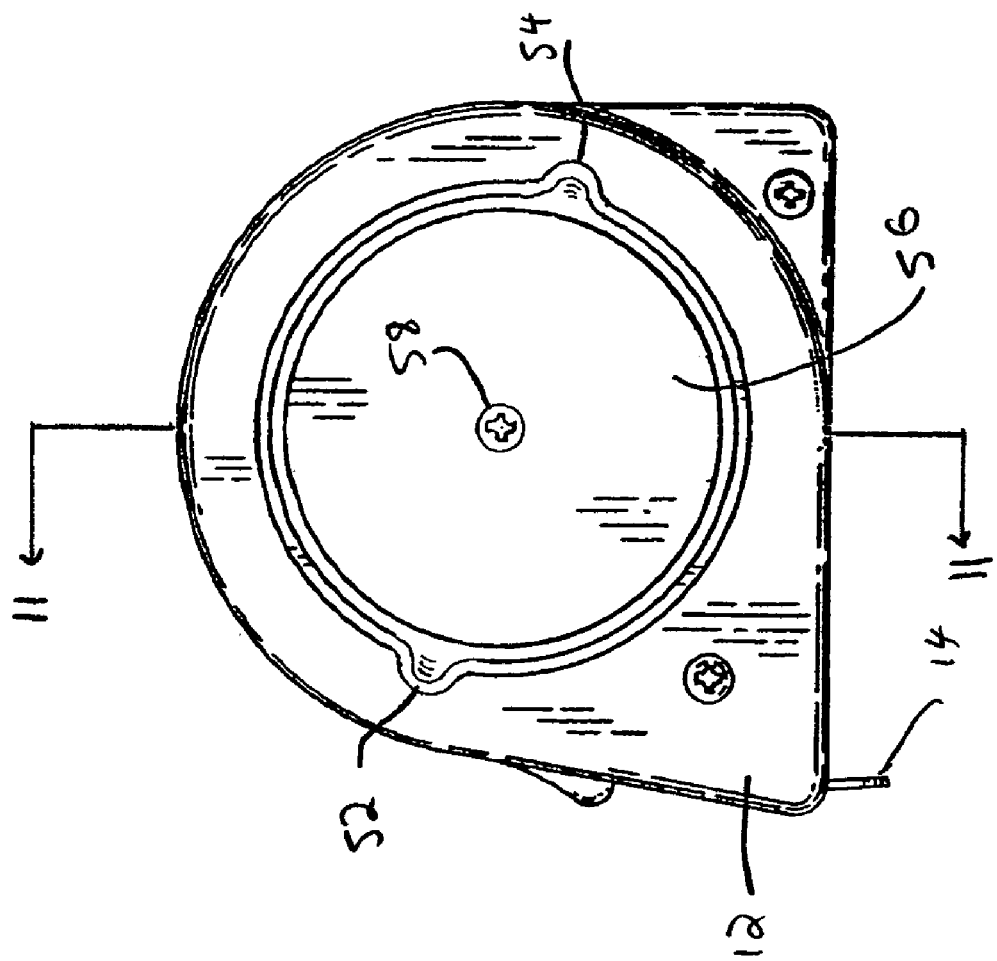

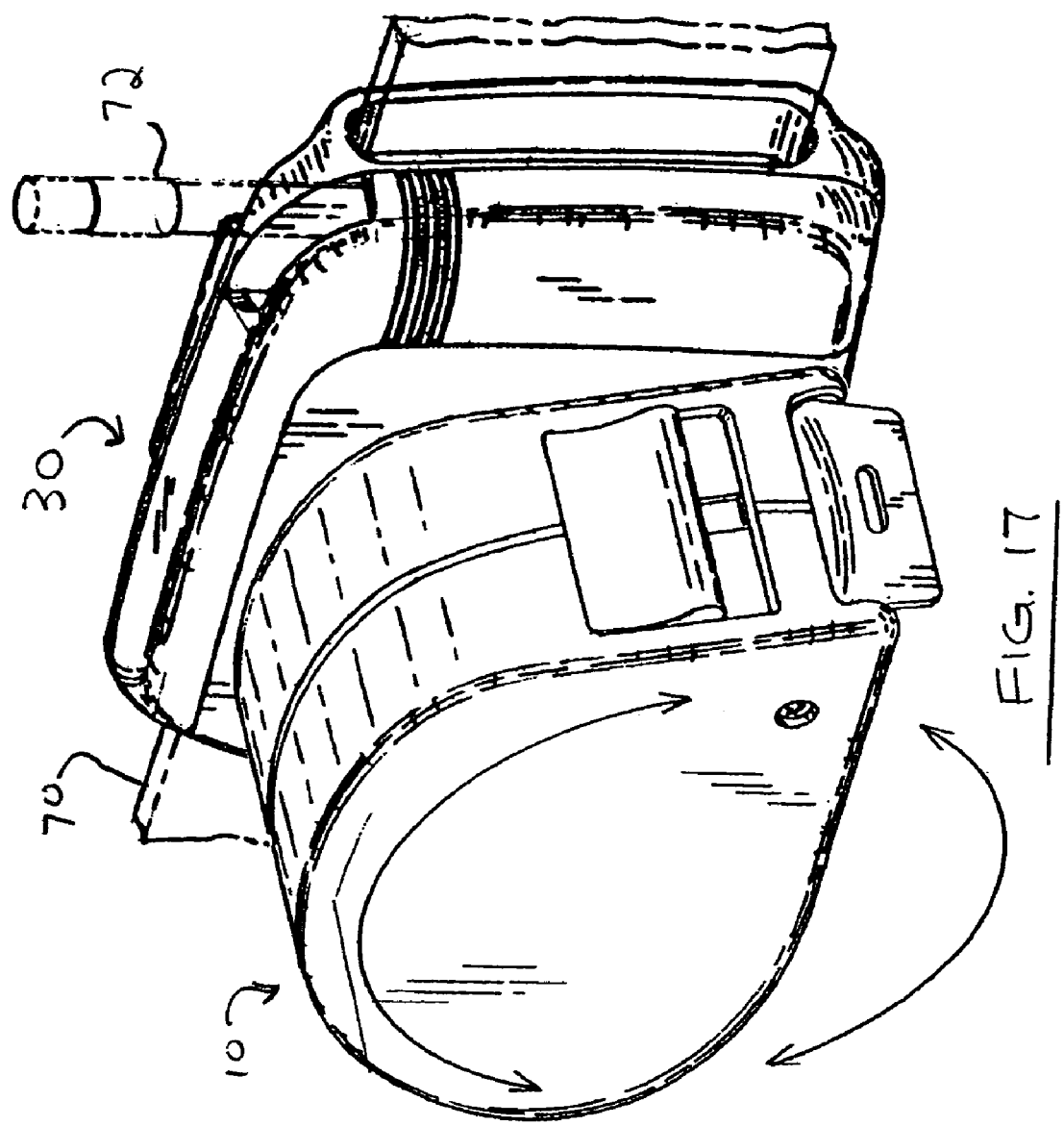

MAGNETIC TOOL AND TOOL HOLDER WITH CAM RELEASE

BACKGROUND OF THE INVENTION

1. Field of the Invention

The present invention relates to magnetic tool holders of the type disclosed in U.S. Pat. No. 5,025,966, and more particularly to magnetic tools and holders for such tools having cooperative cam means for easy release of the magnetic bond between the tool and the holder and having a system for locating the tool when it is separated from the holder.

2. Description of Prior Art

The aforementioned patent of the present inventor discloses a tool holder for mounting on the belt or other item of clothing and a cooperative tool such as a retractable tape measure. The tool is releasably affixed to the holder by the magnetic attraction between a permanent magnet on one of the tool and the holder and a keeper of magnetically permeable material on the other. Such an arrangement provided for quick and easy, one-handed, repeated removal and replacement of the tape in a convenient position. It has been found, however, that the magnetic attraction retaining the tool on the holder is sometimes too great to permit the desired quick and easy removal of the tool. For this reason, the efficacy of the magnetic holder is somewhat compromised. In addition, when the tool is separated from the holder it is sometimes difficult to locate.

3. Objects and Advantages

It is an object of the present invention to provide a tool and cooperative tool holder wherein the tool is releasably maintained upon the holder by magnetic attraction with means for releasing the attraction by manual manipulation of the tool as it is being removed from the holder.

Another object is to provide a structural release mechanism for breaking the magnetic attraction which releasably maintains the tool upon the holder.

Another object is to provide an indicator to aid in locating the tool when it is separated from the holder.

A further object is to provide a tape measure retractable within a hollow case and a cooperative holder for mounting upon a clothing part of the user wherein the case is releasably retained on the holder by magnetic attraction which may easily be released for essentially effortless removal of the tool.

Other objects will in part be obvious and will in part appear hereinafter.

SUMMARY OF THE INVENTION

As in the tool and holder of the previously referenced patent, a permanent magnet is mounted to one and a keeper of magnetically permeable material to the other in order that the tool, disclosed in the form of a flexible measuring tape extensible from and retractable within a hollow case, be releasably retained by magnetic attraction upon the holder. Opposing surface portions of the tool and holder are curved or angled with respect to the direction of magnetic attraction between the two. The surface portions are cooperatively arranged so that manual rotation of the tool with respect to the holder tends to move the tool and holder apart, thereby releasing the magnetic force holding the tool and holder in mutual engagement. Thus, the surface portions, of plastic or other non-magnetic material, act in the nature of a cam translating rotary motion manually imparted to the tape case as it is grasped for removal into linear movement of the case away from the holder, such movement serving to move the magnet and keeper apart from one another. The cam release means are disclosed in two embodiments. The tool includes a receiver that activates a visible or audible indicator upon receipt of a signal. The holder includes a transmitter that selectively sends a signal for receipt by the receiver.

The structure and operation of the invention will be more readily understood and fully appreciated from the following detailed disclosure taken in conjunction with the accompanying drawings.

BRIEF DESCRIPTION OF THE DRAWINGS

The present invention will be more fully understood and appreciated by reading the following Detailed Description in conjunction with the accompanying drawings, in which:

FIG. 1 is a front elevational view of a hollow case for a measuring tape incorporating elements of the invention in a first embodiment;

FIG. 2 is a side elevational view of the case of FIG. 1 with the structural portions of the invention in section on the line 2—2 of FIG. 1;

FIGS. 8 and 9 are perspective views of the tool and holder, respectively, showing the manner of cooperative engagement of the first embodiment of the invention;

FIG. 10 is a front elevational view of a measuring tape case incorporating elements of a second embodiment of the invention;

FIG. 11 is a side elevational view of the tool of FIG. 10;

FIG. 17 is a perspective view showing the tool and holder in the position of mutual engagement in which they are retained by magnetic attraction and the manner of movement of the tool to release such engagement;

DETAILED DESCRIPTION

Figure 3:
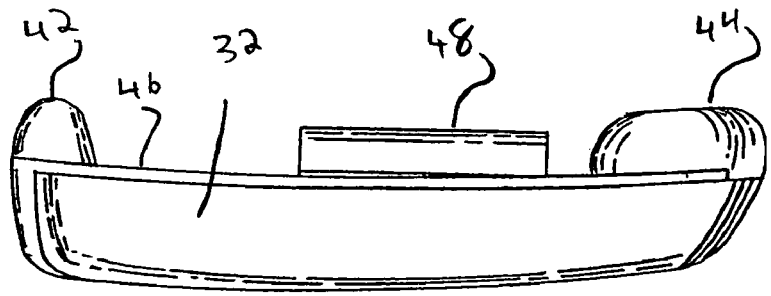
FIG. 3 is a top plan view of a tool holder incorporating elements of the first embodiment of the invention.
Figure 4:
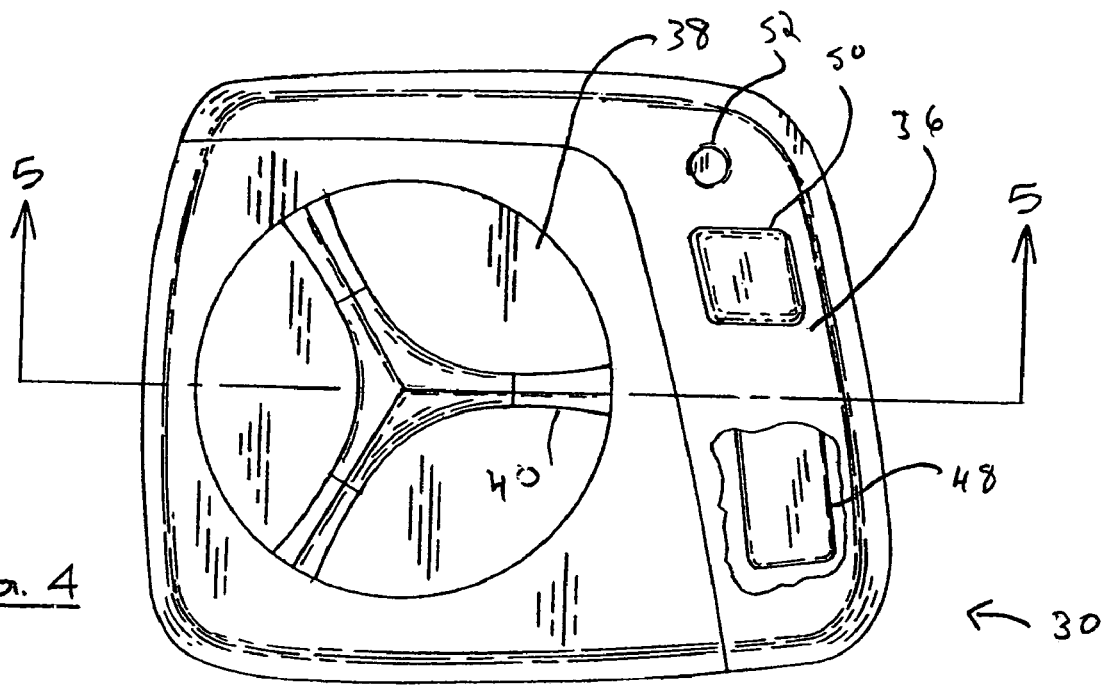
FIG. 4 is a front elevational view of the tool holder of FIG. 3.
Figure 5:
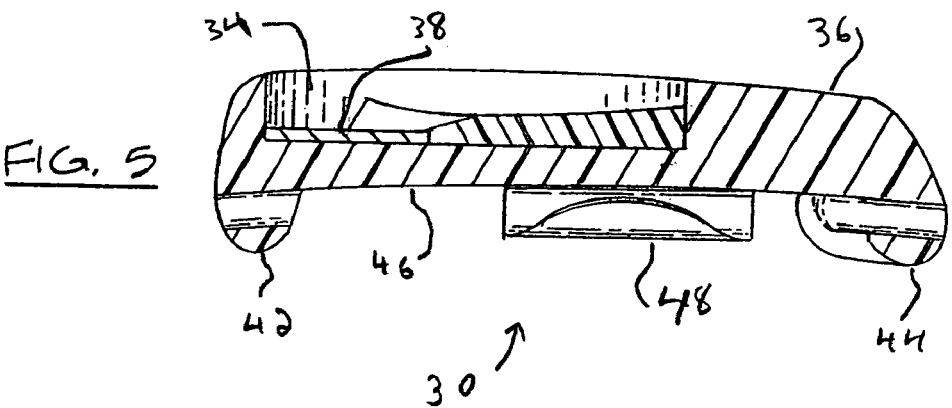
FIG. 5 is a bottom plan view in section on the line 5—5 of FIG. 4.
Figure 7:
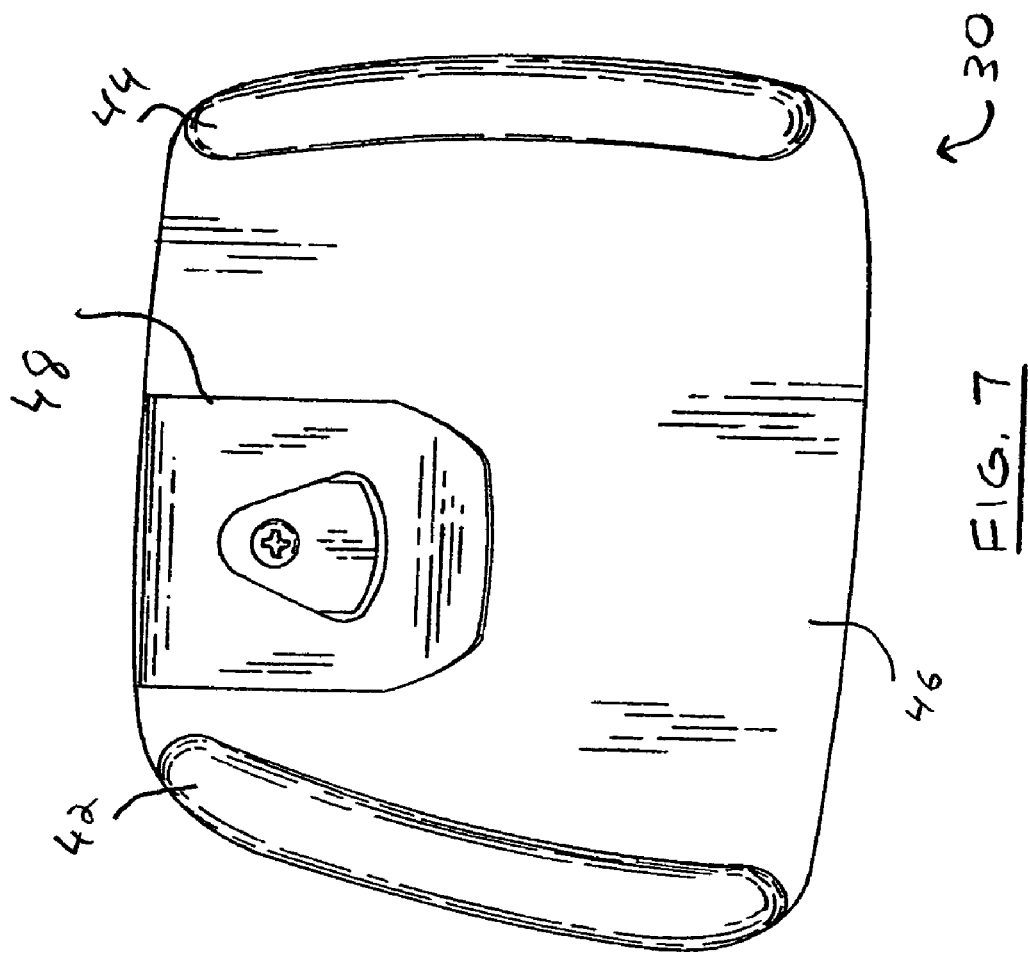
FIG. 7 is a rear elevational view of the first embodiment of the holder.
Figure 6:
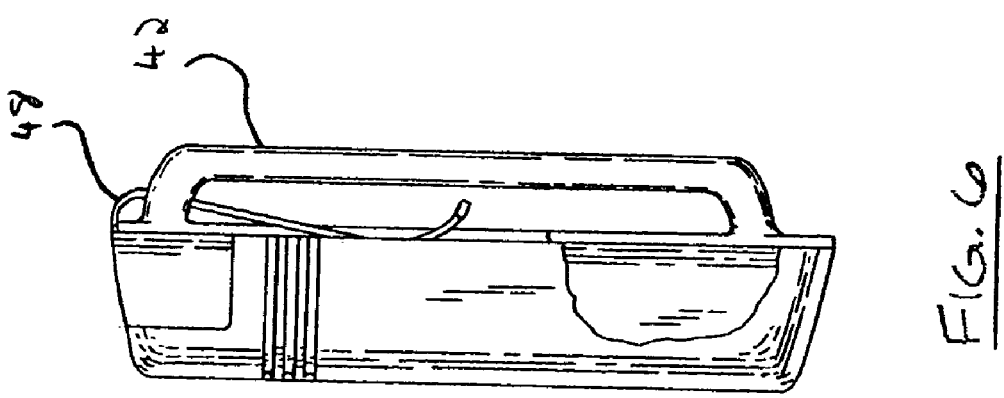
FIG. 6 is a side elevational view of the first embodiment of the holder.
Figure 12:
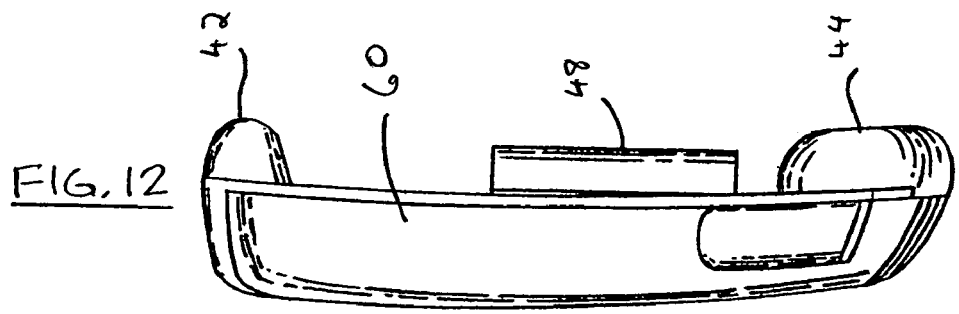
FIG. 12 is a top plan view of a second embodiment of the tool holder.
Figure 13:
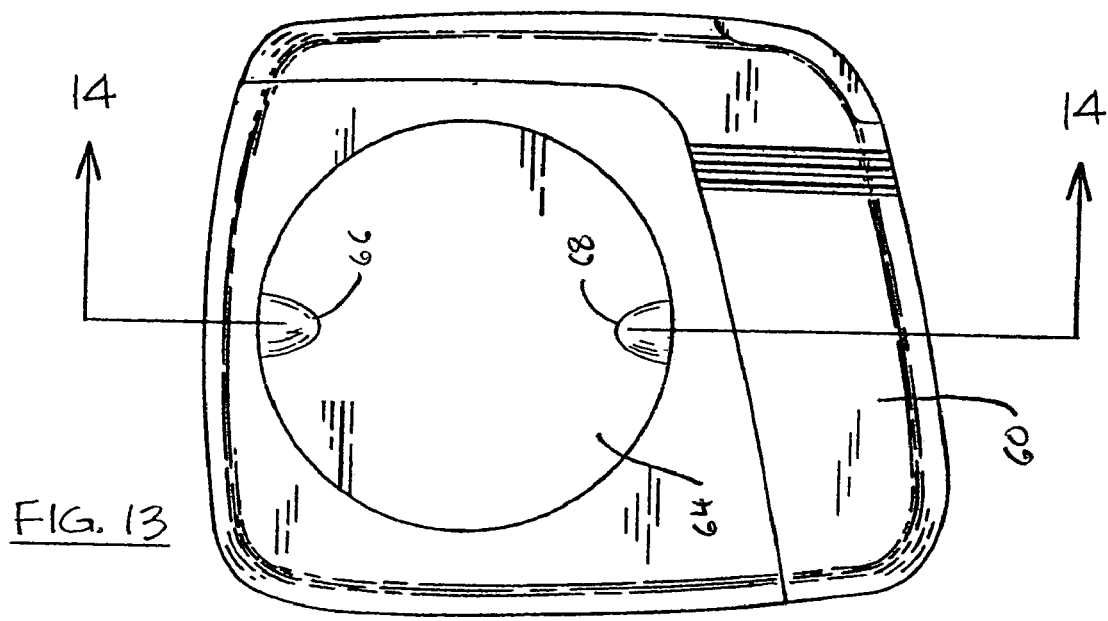
FIG. 13 is a front elevational view of the tool holder of FIG. 12.
Figure 14:
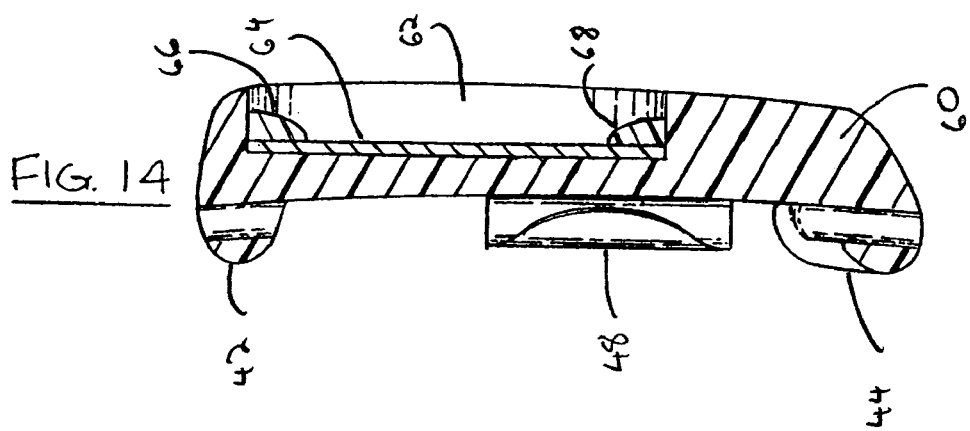
FIG. 14 is a bottom plan view in section on the line 14—14 of FIG. 13.
Figure 16:
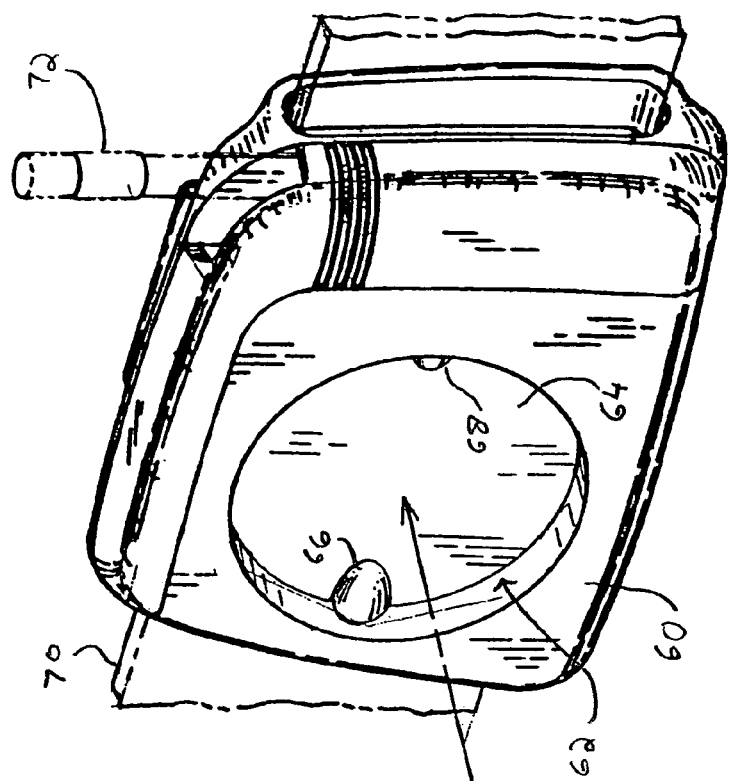
FIGS. 15 and 16 are perspective views of the tool and holder, respectively, showing the manner of cooperative engagement of the second embodiment of the invention.
Figure 15:
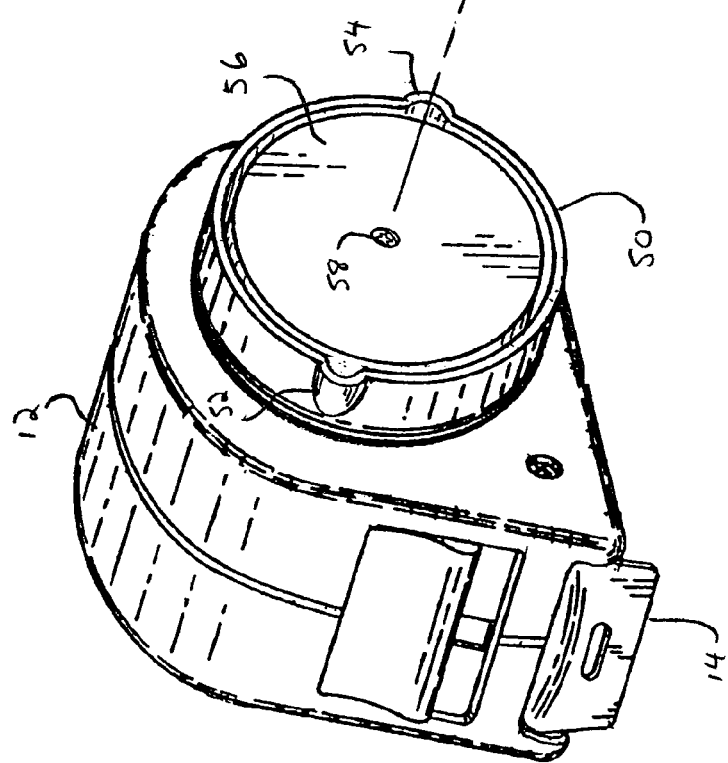

Referring now to the drawings, wherein like reference numerals refer to like parts throughout, in FIGS. 1 and 2 is shown a conventional tool 10 having body portion 12, in the form of a tape measure comprising a hollow housing containing a coiled, flexible metal tape connected to tab 14. Keeper plate 16 of plastic or other non-permeable material is fastened to housing 12 by screw 18. A trio of convex protrusions 20 is formed on the surface of keeper 16. A magnet 22 is fixedly mounted in each protrusion 20.

A receiver 24 is mounted within body portion 12. Alternatively, receiver 24 may be attached to the exterior of tool 10. Receiver 24 is electrically connected to visible indicator 26 audio indicator 28, or both. Preferably, visible indicator 26 is a light emitting diode (LED) and audio indicator 28 is a speaker. When receiver 24 receives a signal from transmitter 48 (FIG. 3), visible indicator 26 emits a visible signal and/or audio indicator 28 emits an audible signal, to aid in location of tool 10 when it is separated from holder 30 (FIG. 3).

The tool holder of the invention, denoted generally by reference numeral 30, is shown in a first embodiment in FIGS. 3–7. Holder 30 includes plastic body 32 having cylindrical recess 34 in its front face 36 wherein metal plate 38 is mounted. Plastic protrusion 40 extends through cylindrical recess 34. Belt loops 42, 44 are integrally formed with body 32, extending from rear face 46 thereof. Clip 48, for use alternatively to belt loops 42, 44, is affixed to rear face 46 between the belt loops 42, 44.

Transmitter 48 is mounted within body 32. A button 50 is accessible on the exterior of body 32, such that when button 50 is pressed, transmitter 48 emits a signal. A transmit indicator 52 is visible on the exterior of body 32 and is electrically connected to transmitter 48 such that transmit indicator 52 provides a visible indication when transmitter 48 is transmitting a signal.

Tool 10 and holder 30 are shown in FIGS. 8 and 9, respectively, in spaced relation. When the tool is to be releasably mounted upon the holder it is moved in the direction of the arrow until the outer surface of keeper plate 16 is positioned within recess 34, wherein magnets 22 and metal plate 38 are positioned with opposing surfaces either in contacting relation or spaced by a distance small enough that the magnetic attraction between magnet and plate maintains the tool in firm engagement with the holder. When so engaged, protrusions 20 are on opposite sides of protrusion 40 whereby, when housing 12 is manually grasped and rotated, protrusions 20 ride up on protrusion 40 in a camming action moving the opposing surfaces of magnets 22 and metal plate 38 away from one another, thus facilitating release of the tool from the holder.

Transmitter 48 selectively emits a signal that is received by receiver 24. Preferably, the signal is modulated to produce a code that is distinguishable from codes of other transmitters 48. When a receiver 24 detects a signal containing the coded modulation of the receiver's matched holder 30, the receiver 24 activates its visible indicator 26 and/or audible indicator 28. Preferably the coded modulation used by any pair of receiver 24 and transmitter 48 can be distinguished from other pairs in the same general area. In this way, multiple pairs of tools 10 and holders 30 can operate in a limited area without substantial interference.

The tool and holder are shown in a second embodiment in FIGS. 10–16. The tool is again in the form of a tape measure having the same housing 12 and flexible tape tab 14 as in the first embodiment. A cup-like receptacle 50 includes outwardly protruding portions 52 and 54 on opposite sides of its periphery and magnet 56 within the receptacle. The magnet and receptacle are affixed to housing 12 by screw 58. The holder includes molded plastic body 60 with recess 62 in its front face. Belt loops 42, 44 and clip 48 are identical to the same elements of the first embodiment. Keeper plate 64 of magnetically permeable material is retained in recess 62 by protrusions 66 and 68. When the tool is to be mounted upon the holder, the two are placed in the position of FIGS. 15 and 16 and the tool is moved in the direction of the arrow. Protrusions 66 and 68 are aligned with portions 52 and 54 so that, when the surface of magnet 56 approaches the opposing surface of keeper 64, the protrusions extend into portions 52 and 54. When the tool is to be disengaged from the holder, manual rotation of the tool again produces a camming action tending to move the opposing surfaces of the magnet and keeper apart, thereby breaking the magnetic attraction and facilitating removal of the tool.

The manner of rotation of the tool is indicated by the arrows in FIG. 17, which may represent either of the two embodiments. A fragment of belt 70, passing through loops 42 and 44, is shown in phantom lines in FIGS. 9, 16 and 17, as is pencil 72 which may be carried in a molded cavity of the body of the holder. Of course, the keeper plate and magnet may be reversed in either embodiment, the only requirement being that one is mounted upon the tool and the other upon the holder. Likewise, the number of protrusions or similar structural portions providing the camming function may be more (or less) than three, if desired, it being preferred that a like number be present on tool and holder.

Figure 18:
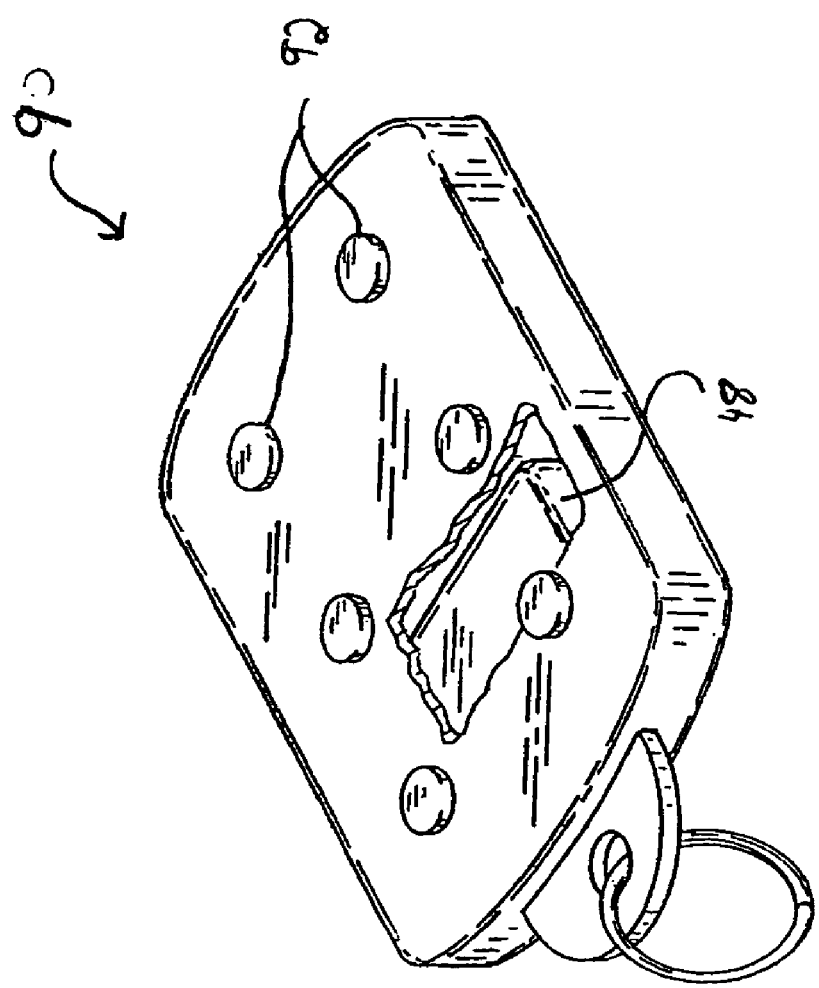
FIG. 18 is a perspective view of a locator transmitter according to another embodiment of the invention.

In another embodiment (FIG. 18), transmitter 48 is independent of holder 30 and is capable of selectively transmitting a plurality signals containing distinct codes that correspond to receivers 24 mounted on a plurality of tools 10, as shown in FIGS. 1 and 2. According to this embodiment, transmitter 48 is located in a key fob 90 or separately attached, for example, to a tool belt (not shown). According to this embodiment, transmitter 48 comprises a plurality of buttons 92, each of which activate transmitter 48 to emit a different coded signal. In this way, one transmitter 48 can be used to locate a plurality of tools 10, each of which contains a receiver 24 that responds to a different coded signal.

What is claimed is:

1. A tool adapted for releasable mounting upon a cooperating tool holder having thereon one of a magnet and a keeper of magnetically permeable material and a structural portion providing a first camming surface, said tool comprising:
   a) a body portion;
   b) the other of said magnet and keeper affixed to said body portion, whereby said tool is adapted for engagement with said holder by the magnetic attraction of opposing surfaces of said magnet and keeper; and
   c) a second camming surface selectively movable with respect to said first camming surface to move said opposing surfaces apart and break said magnetic attraction, thereby facilitating removal of said tool from said holder.

2. The tool of claim 1 wherein said body portion is a hollow housing containing a flexible metal measuring tape.

3. The tool of claim 1 and further including a receptacle wherein said other of said magnet and keeper is mounted.

4. The tool of claim 3 wherein said receptacle is cup-like, having a substantially cylindrical side wall.

5. The tool of claim 4 wherein said second camming surface comprises one or more portions of said side wall.

6. The tool of claim 1 wherein said second camming surface comprises one or more protrusions having surfaces angled with respect to said opposing surfaces.

7. The tool of claim 6 wherein said other of said magnet and said keeper includes a central opening wherein said protrusions are mounted.

8. The tool of claim 1 and further comprising
   a) a receiver proximate said body portion; and
   b) an indicator for alerting in response to a signal received by said receiver.

9. The tool of claim 6 wherein said indicator is a visible indicator.

10. The tool of claim 6 wherein said indicator is an audible indicator.

11. A magnetic tool holder for releasable support of a cooperable tool having thereon one of a magnet and a keeper of magnetically permeable material and a structural portion providing a first camming surface, said holder comprising:
 a) a body portion;
 b) the other of said magnet and said keeper affixed to said body portion of said holder, whereby said tool is adapted for engagement with said holder by the magnetic attraction between opposing surfaces of said magnet and said keeper; and
 c) a second camming surface positioned for cooperative engagement with said first camming surface upon manual movement of said tool with respect to said holder to move said opposing surfaces apart, thereby breaking said magnetic attraction and facilitating removal of said tool from said holder.

12. The tool holder of claim 11 wherein said body portion of said holder is of molded plastic.

13. The tool holder of claim 12 wherein said body portion of said holder includes at least one integrally formed belt loop.

14. The tool holder of claim 11 wherein said body portion of said holder includes a recess and said second camming surface is disposed within said recess.

15. The tool holder of claim 14 wherein said recess has a substantially circular periphery and said second camming surface is substantially centrally disposed within said periphery.

16. The tool holder of claim 15 wherein said other of said magnet and keeper is disposed within said recess and has an opening wherein said second camming surface is disposed.

17. The tool holder of claim 14 wherein said recess has a substantially circular periphery and said second camming surface is disposed substantially adjacent said periphery.

18. The tool holder of claim 17 wherein said other of said magnet and keeper is disposed within said recess.

19. The tool holder of claim 11 further comprising:
 a) a transmitter proximate said body portion, for transmitting a signal to a receiver attached to said tool; and
 b) a button for selectively operating said transmitter to transmit a signal to activate an indicator to aid in locating said tool.

20. A cooperable magnetic tool and tool holder for releasable engagement to hold said tool upon said holder in a first relative position by magnetic attraction, said tool and holder comprising:
 a) a body portion of said tool;
 b) a body portion of said holder;
 c) a permanent magnet fixedly mounted upon one of said body portion of said tool and body portion of said holder;
 d) a keeper of magnetically permeable material mounted upon the other of said body portion of said tool and body portion of said holder;
 e) said magnet and keeper being so arranged upon said body portion of said tool and body portion of said holder that placement of said tool and holder in said first relative position places respective surfaces of said magnet and keeper in opposing relation with magnetic attraction between the two maintaining said tool mounted upon said holder in said first relative position;
 f) first and second cooperable camming surfaces on said body portion of said tool and body portion of said holder, respectively; and
 g) said first and second camming surfaces being cooperably positioned when said tool and holder are in said first relative position to cause movement of said opposing surfaces away from one another in response to manual rotation of said tool with respect to said holder, thereby breaking said magnetic attraction and facilitating removal of said tool from said holder.

21. The tool and holder of claim 20 and further including a cup-like receptacle on said body portion of said tool within which said one of said magnet and keeper is disposed.

22. The tool and holder of claim 21 wherein said first camming surface protrudes outwardly from said receptacle.

23. The tool and holder of claim 20 and further including a recess in a surface of said body portion of said holder wherein said other of said magnet and keeper is disposed.

24. The tool and holder of claim 23 wherein said second camming surface is disposed within said recess.

25. The tool and holder of claim 20 and further comprising
 a) a receiver proximate said body portion of said tool;
 b) an indicator that alerts in response to a signal received by said receiver; and
 c) a transmitter for selectively transmitting a signal to said receiver.

26. The tool and holder of claim 25 wherein said indicator is a visible indicator.

27. The tool and holder of claim 25 wherein said indicator is an audible indicator.

28. The tool and holder of claim 25 wherein said transmitter is proximate said body portion of said holder.

\* \* \* \* \*